United States Patent
Kurian

(10) Patent No.: US 11,122,037 B2
(45) Date of Patent: Sep. 14, 2021

(54) INTERNET OF THINGS ("IOT") PROTECTION RETRO-SYSTEM

(71) Applicant: Bank of America Corporation, Charlotte, NC (US)

(72) Inventor: Manu Kurian, Dallas, TX (US)

(73) Assignee: Bank of America Corporation, Charlotte, NC (US)

(*) Notice: Subject to any disclaimer, the term of this patent is extended or adjusted under 35 U.S.C. 154(b) by 704 days.

(21) Appl. No.: 15/906,089

(22) Filed: Feb. 27, 2018

(65) Prior Publication Data

US 2019/0268334 A1    Aug. 29, 2019

(51) Int. Cl.
| | | |
|---|---|---|
| *H04L 29/06* | (2006.01) | |
| *H04L 29/08* | (2006.01) | |
| *H04W 12/06* | (2021.01) | |
| *H04L 12/24* | (2006.01) | |
| *H04L 12/26* | (2006.01) | |

(52) U.S. Cl.
CPC ...... *H04L 63/0876* (2013.01); *H04L 41/0806* (2013.01); *H04L 41/0893* (2013.01); *H04L 43/0876* (2013.01); *H04L 63/126* (2013.01); *H04L 67/12* (2013.01); *H04W 12/06* (2013.01); *H04L 69/18* (2013.01)

(58) Field of Classification Search
CPC ............. H04L 63/0876; H04L 41/0806; H04L 41/0893; H04L 43/0876; H04L 63/126; H04L 67/12; H04L 69/18; H04W 12/06
See application file for complete search history.

(56) References Cited

U.S. PATENT DOCUMENTS

| | | |
|---|---|---|
| 9,319,404 B2 | 4/2016 | Svigals |
| 9,485,231 B1 | 11/2016 | Reese |
| 9,565,192 B2 | 2/2017 | Chillappa et al. |
| 9,591,016 B1 | 3/2017 | Palmieri et al. |

(Continued)

OTHER PUBLICATIONS

Conoscenti et al., "Peer to Peer for Privacy and Decentralized in the Internet of Things," 2017, IEEE, pp. 288-290. (Year: 2017).

(Continued)

*Primary Examiner* — Lynn D Feild
*Assistant Examiner* — Jessica J South
(74) *Attorney, Agent, or Firm* — Weiss & Arons LLP; Michael A. Springs, Esq.

(57) ABSTRACT

Methods for securing communication in a network of IoT devices is provided. Methods include selecting a base IoT hub for operating as an intermediary layer for IoT devices. Methods include selecting from the plurality of IoT devices a selected plurality of IoT devices. Each of the selected IoT devices is configured to send and receive electronic communications. Methods include linking each of the selected plurality of IoT devices to the base IoT hub. Methods include storing, in a data repository within the hub, identification data associated with each of the IoT devices. The communication-types typically associated with each of the selected plurality of IoT devices are stored in the data repository. When an IoT device is activated to send a communication, methods include comparing and analyzing the communication and identification data of the activated device to stored identification data and communication-types of the selected IoT devices.

18 Claims, 6 Drawing Sheets

(56) References Cited

U.S. PATENT DOCUMENTS

| | | | |
|---|---|---|---|
| 9,699,659 | B2 | 7/2017 | Zehavi et al. |
| 9,699,814 | B2 | 7/2017 | Zakaria et al. |
| 9,716,595 | B1 | 7/2017 | Kravitz et al. |
| 9,729,528 | B2 | 8/2017 | Zakaria et al. |
| 9,825,921 | B2 | 11/2017 | Reese |
| 9,875,510 | B1 | 1/2018 | Kasper |
| 10,251,053 | B1 | 4/2019 | Paczkowski |
| 2011/0208866 | A1* | 8/2011 | Marmolejo-Meillon ............... H04L 63/0823 709/227 |
| 2014/0006784 | A1* | 1/2014 | Walker ............... H04W 12/06 713/169 |
| 2015/0081860 | A1* | 3/2015 | Kuehnel ............ G06Q 30/0254 709/222 |
| 2016/0112262 | A1* | 4/2016 | Johnson ............. H04L 61/1511 709/221 |
| 2016/0173495 | A1 | 6/2016 | Joo |
| 2016/0248746 | A1 | 8/2016 | James et al. |
| 2016/0259937 | A1 | 9/2016 | Ford et al. |
| 2016/0260095 | A1 | 9/2016 | Ford |
| 2016/0337127 | A1 | 11/2016 | Schultz et al. |
| 2016/0366181 | A1 | 12/2016 | Smith et al. |
| 2017/0163444 | A1 | 6/2017 | McLaughlin et al. |
| 2017/0289184 | A1 | 10/2017 | C et al. |
| 2018/0253451 | A1 | 9/2018 | Callan et al. |
| 2019/0172566 | A1 | 6/2019 | Schulman et al. |
| 2019/0250899 | A1* | 8/2019 | Riedl .................... H04L 9/0841 |
| 2019/0289454 | A1 | 9/2019 | Inoue |
| 2019/0349190 | A1 | 11/2019 | Smith et al. |

OTHER PUBLICATIONS

"Securing the Internet of Things: A Proposed Framework," https://www.cisco.com/c/en/us/about/security-center/secure-iot-proposed-framework.html, Mar. 16, 2016.
"Global Hacker Botnet tops 6 million hijacked devices," http://www.computerweekly.com/news/450427023/Global-hacker-botnet-tops-6-million-hijacked-devices, Sep. 27, 2017.
"IoT Standards and Protocols," https://www.postscapes.com/internet-of-things-protocols, Retrieved on Feb. 14, 2018.
"The Internet of Things Is Far Bigger Than Anyone Realizes," https://www.wired.com/insights/2014/11/the-internet-of-things-bigger/, Retrieved on Dec. 4, 2017.
"Internet of Things," Wikipedia—https://en.wikipedia.org/wiki/Internet_of_things, Dec. 4, 2017.

* cited by examiner

INTERNET OF THINGS ("IOT") PROTECTION RETRO-SYSTEM

FIELD OF TECHNOLOGY

Aspects of the invention relate to securing the Internet of Things ("IoT") devices. Specifically, aspects of the invention relate to systems and methods for securing communications within a plurality of IoT devices.

BACKGROUND OF THE DISCLOSURE

As technology advances and the development of the IoT expands, security challenges and security requirements have drastically increased. In an IoT platform there are many different communications occurring. Devices are in communication with other devices. The communications may be a one-to-one communication. The communication may be a one-to-many communication. Devices are all in communication with the internet. Devices may also be in communication with applications running in a cloud.

As the IoT platform grows, the incoming and outgoing communications are more open to security threat. For example, in an IoT system, devices are in connection with the internet. Once a device is connected to the internet, there is a greater chance for direct attack to the device.

Therefore, it would be desirable to have systems and methods for ensuring that the authenticity of the communications will not be compromised and that unauthorized devices and/or communications will be prevented from attacking the system.

SUMMARY OF THE DISCLOSURE

A system for securing the communication in a network formed from a plurality of Internet of Things ("IoT") devices is provided. The system may include a plurality of IoT devices. The IoT devices may be embedded with electronic circuitry, software, and/or sensor(s). The IoT devices may be embedded with hardware as well. The IoT devices may be embedded with other components not included herewith.

Each of the IoT devices may be configured to send and receive electronic communications. A communication may include a request for data. A communication may include transmittal of data. The communication may include device to device communication. The communication may include communication between a device and an application running in the cloud. The communication may include communication between a device and a service running in the cloud. The communication may be an instruction for executing an action on a piece of hardware and/or software of the device.

The system may also include a base IoT hub. Each of the plurality of IoT devices may be linked to the base IoT hub. Each of the IoT devices may be linked simultaneously. The plurality of IoT devices linked to the base IoT hub may establish a trust alliance among the devices. Additional IoT devices may be linked, retroactively, at a later time. The base IoT hub may include a data repository. The base IoT hub may further include a data analysis engine. The base IoT hub may also include a processor.

The data repository may be for storing identification data of each of the linked IoT devices. The data repository may also be for storing communication-types typically associated with each of the IoT devices. The data analysis engine may be configured to analyze each of the incoming and outgoing communications. The data analysis engine may be enabled to determine and block any unauthorized user from communicating with the IOT devices. The communications may be analyzed prior to execution of the communications. The communication may be a one-to-one communication. The communications may be a one-to-many communication. The communication may be transmitted from the IoT device to a second location. The communication may be transmitted from a second location to the IoT device. The communication may be transmitted from one IoT device to one or more additional IoT devices linked to the base IoT hub. The communication may further include a communication from a device to the internet.

In certain embodiments, the IoT devices linked to the base IoT hub may include a direct connection to the internet. Each of the IoT devices may be configured to transmit the communications directly to the internet. The system is configured to initially transmit the communication to the base IoT hub for analysis and verification. When the communication is authorized, the base IoT hub may be further configured to transmit the communication to the device for execution. Thereafter, each of the devices may preferably transmit the authorized communication via the internet.

In an alternative embodiment, the IoT devices may include a connection to the internet solely via the base IoT hub. The communications may be transmitted from the hub to the internet. When a communication is authorized to be executed, the system may include transmitting the communication to the internet via the hub. The base IoT hub may mask the identify of each of the IoT devices. This may further protect each IoT device from exposing its identity to the internet, and thereby, gaining a greater level of security. This may also minimize Distributed-Denial-Of-Service ("DDOS") attacks. In a DDOS attack, a malicious actor may acquire illicit access to, and control of, many devices that are coupled to the internet. Therefore, devices connecting to the internet via the base IoT hub reduce exposure to, and the chance of being coopted in, a DDOS attack.

An IoT device may be activated to send a communication in response to a sensor embedded in the device being triggered.

The sensor may be triggered and activate the device to send a communication based on user-set configurations stored on the device. A user may configure the device to perform a function or execute an action at a specified time. A user may configure the device to perform a function or execute an action based on specified behaviors and surroundings. These configurations may be included in the identification data of the device. An IoT device may be activated to send a communication based on pre-determined behaviors of each IoT device.

The communication may be initially transmitted to the base IoT hub for authorization. The data analysis engine of the base IoT hub may be configured to compare the communication of the active device to the communication-types stored in the database. The communication-types for each IoT device stored in the database may be typical communication-types that the IoT device associated with it may perform. The comparison may be necessary for verifying identification of the active device.

When storing identification data and typical communication-types associated with each of the IoT devices, the system may be enabled, via the data analysis engine, to prevent an individual with malicious intent from attempting to connect to the base IoT hub from one of the devices. If an unauthorized user does connect to one of the devices, the system may further be enabled to distinguish the attempted communications from the typical communication-types of the IoT devices. The data analysis engine may perform an analysis for verifying the communication. The analysis may be performed by comparing the identification data and the communication of the active device to the identification data and communication-types of the linked devices that may be stored in the data repository. The analysis may determine whether the active device sending the communication is a device within the system.

The processor included in the base IoT hub, may be for processing and executing the communications. The processor may execute communications based on the analysis. The communication may be effected between devices located in close proximity to one another. The communication may be effected between remote devices. When the distance between the devices is small, such as between 0 to 50 meters, zero to 75 meters, or zero to 100 meters, communication protocols may be selected from one or more of Wi-Fi, Bluetooth, ZigBee, Z-wave, and 4G LTE or any other suitable communication protocols operative in a close range. When the distance for transmittal of the communication is remote, such as between 0 to 1 kilometer, zero to 10 kilometers, or zero to 100 kilometers, communication protocols may be selected from one or more of Wi-Fi, 4G LTE, Sigfox, and OnRamp or any other suitable remote communication protocols.

In one embodiment, if the data analysis engine determines that the communication is a communication-type typically associated with the active device and the identification data of the active device corresponds to the identification data of any one of the linked IoT devices, the processor may be configured to mask, in the communication, an IP address of the active device and the base IoT hub may serve as a proxy for the active device and execute the communication.

In another embodiment, if the communication is not a communication-type typically associated with the active device and/or the data of the active device does not match, in its entirety, the data of any one of the linked IoT devices, the processor may be configured to terminate the communication prior to fulfillment of the communication.

For example, if a device that is not linked to the IoT hub attempts to send a communication, the data analysis engine may perform an analysis. The data analysis engine may determine that the identification data of the active device does not match any one of the identification data's associated with the linked IoT devices stored in the data repository. When there is no match determined, the processor may be configured to terminate the communication. In another example, the data analysis engine may determine that the identification data of the active device matches to one of the identification data's of the linked IoT devices. However, when the analysis is performed on the communication itself, the data analysis engine may determine that the communication does not match any one of the communication-types typically associated with the linked device and therefore may terminate the communication.

When the communication is terminated, the system may further be configured to mask the identification of the base IoT hub and identify the transmitting device of the communication as the transmitter. This may confuse an individual with malicious intent and protect the network from attack.

When the system necessitates terminating the communication—i.e., when an unauthorized device is attempting to transmit a communication, the system may obtain the profile details of the device. For example, the system may obtain identification data of the hardware on the device attempting to transmit an unauthorized communication. The system may be configured to change an IP address associated with the device to a new IP address in order to gain full control of the communications transmitted by the unauthorized device. The base IoT hub may now recognize the device and be enabled to block it from further attempting to transmit unauthorized communications.

In an alternative embodiment, the system may further determine that the IoT device is an authorized, linked device. However, the device may be under attack and the communication is not an authorized communication. In this embodiment, when the system assigns a new IP address to the device, the system may be configured to obtain control over the device and monitor future communications associated with the device. Pursuant to the monitoring, the system may enable only the communications that correspond to the communication-types stored in the data repository associated with the linked device.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
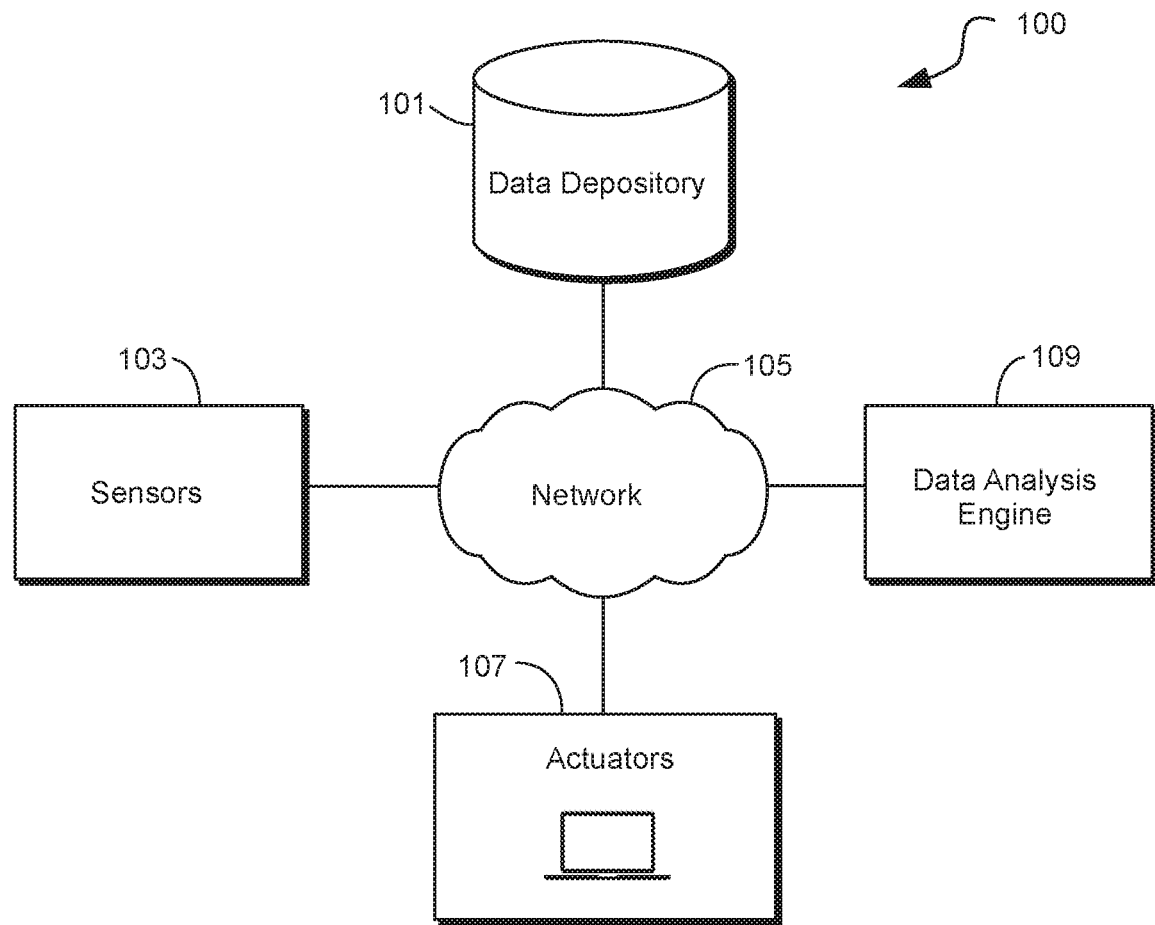
FIG. 1 shows an illustrative system architecture in accordance with principles of the invention.

A method for securing the communication in a network formed from a plurality of Internet of Things ("IoT") devices is provided. The method may include selecting a base IoT hub for operating as an intermediary layer for IoT devices. The base hub may include a data repository, a data analysis engine, and a processor. The method may further include selecting from the plurality of IoT devices a selected plurality of IoT devices. The selected plurality of IoT devices may be embedded with electronic circuitry, software, and/or sensor(s). Each of the selected IoT devices may be configured to send and receive electronic communications.

The method may also include linking each of the selected plurality of IoT devices to the base IoT hub. The linking of the devices may further include storing in the data repository, data associated with each of the IoT devices. The identification data of each of the selected plurality of IoT devices may be stored in the data repository within the base IoT hub. The communication-types typically associated with each of the selected plurality of IoT devices may also be stored in the data repository within the base IoT hub.

In certain embodiments, the linking of the IoT devices may further include disconnecting a direct connection to the internet within each of the selected IoT devices. The method may further include providing a connection to the internet solely via the base IoT hub.

In response to a first selected IoT device being activated, the method may further include receiving, at the base IoT hub, a communication transmitted from the active IoT device. The data analysis engine may be generated to perform an analysis for verifying identification of the active device. The analysis may include comparing the communication of the active device to the communication-types stored in the data repository of the first selected IoT device. The analysis may also include comparing the identification data of the active IoT device to the identification data of the first selected IoT device stored in the data repository.

The analyzing may further include determining if the communication is a communication-type typically associated with the active device and the identification data of the active device corresponds to the stored identification data of the first selected IoT device. If both correspond (i.e. the communication-type and the identification data), the system may include masking, via the processor, the identification data of the active device. The processor may further include displaying, in the communication, the identification data of the base IoT hub. The processor may further include executing the communication to the internet directly from the base IoT hub enabling protecting identity of the active device.

The data analysis engine may determine that the communication is not a communication-type typically associated with the active device. The data analysis engine may determine that the data of the active device does not match, in its entirety, the data of the first selected IoT device. When the communication and/or the identification data of the active device does not match to the first selected IoT device, the method may further include terminating the execution of the communication prior to fulfillment of the communication.

In an alternative embodiment, each of the selected IoT devices may include a direct connection to the internet. The method may include transmitting the communication to the base IoT hub for analysis and verification. When the communication is authorized, the method may further include transmitting the communication to the device for execution.

In certain embodiments, the base IoT hub may be segmented into a plurality of channels. Each channel may operate as an individual hub. Each channel individually may act as the originator of the communication. Thereby, when the communication is authorized at the data analysis engine of the base IoT hub, a selected channel may represent the base IoT hub and act as the originator of the communication.

In some embodiments, each channel may generate an IP address that is different from both the individual hub and the originating active device.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of the methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method or another method described herein.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative system architecture 100. Architecture 100 may represent an interne of things ("IoT"). A differentiator between IoT and conventional networks is a traffic profile. In an IoT, nodes may not have defined or known network positions, communication protocols or security services. Solutions that allow architecture 100 to function seamlessly and leverage such disparate components are disclosed herein.

Architecture 100 may include nodes. Each node may include two or more nodes. FIG. 1 shows exemplary nodes 101, 103, 105, 107 and 109. The architecture includes sensors 103. Sensors 103 may include devices that detect changes in a physical or virtual environment. For example sensors may measure audio, rainfall or water levels. Sensors may measure electronic network traffic, electronic signals (e.g., input or output) or frequency of user logins from within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smart phones, jewelry or refrigerators. Sensors may be relatively inexpensive and have low energy consumption. Sensors may "sense" two or more stimuli or environmental changes.

Sensors may implement two or more functions. For example, sensors may measure changes in their native environment, capture data related to the measured changes store and communicate the captured data. Sensors may be accessed by other sensors or any other node. Sensors may transmit captured data to another node. Sensors may broadcast captured data to two or more nodes.

Captured data may be transmitted using any suitable transmission method. For example, data captured by a sensor may be extracted by a mobile phone. Sensors may leverage a communication link provided by a mobile phone to communicate captured data to another node.

Each sensor may be a node and each sensor may be assigned a unique identifier. For example, sensors may be identified by one or more radio frequency identification ("RFID") tags. The RFID tag may be stimulated to transmit identity information about the sensor or any other information stored on the RFID tag.

Captured data may be transmitted by the sensor and processed far from the location of the sensor that captured the data. For example, captured data may be transmitted from one node to another node until the captured data reaches data repository 101.

Sensors may be positioned and capture data from diverse locations. Locations may include geographic locations or virtual locations on electronic networks. Captured data may be transmitted to a location where information is needed for decisioning or consumption, which may not be the same place the data was captured or generated. Data synchronization protocols and caching techniques may be deployed to ensure availability of information at, or delivery to, a desired node. For example, a location where data is captured may not have continuous reliable network connectivity. Accordingly, captured data may be stored locally on the sensor for an amount of time prior to transmission or broadcast to another node.

Contextually, captured data may provide information not only about the physical environment surrounding a sensor, but the capturing of data from multiple sensors may provide data that signifies an event. Sensors may be grouped. Sensors may be grouped based on physical proximity or based on the content (or expected content) of data captured. Sensors may be grouped virtually. Other nodes, such as data analysis engine 109 may create and/or be included in such groups. In some embodiments, the captured data may be organized by data repository 101.

Based on data captured from sensors 103, actuators 107 may respond to a detected event. Based on the capture and analysis of multiple sources of data, actuators 107 may be instructed to take action without human intervention.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable operation.

A processor circuit may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a processor circuit may be coupled together by a system bus, wirelessly or by other interconnections and may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 1, a node may operate in a networked environment. A node may be part of two or more networks. A node may support establishing network connections to one or more remote nodes. Such remote nodes may be sensors, actuators or other computing devices. Nodes may be personal computers or servers. Network connections may include a local area network ("LAN") and a wide area network ("WAN"), and may also include other networks. When used in a LAN networking environment, a node may be connected to the LAN through a network interface or adapter. The communication circuit may include the network interface or adapter.

When used in a WAN networking environment, a node may include a modem or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a battery, speaker, and antennas. Network nodes may be portable devices such as a laptop, tablet, smartphone, "smart" devices (e.g., watches, eyeglasses, clothing having embedded electronic circuitry) or any other suitable device for receiving, storing, transmitting and/or displaying relevant information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display power must be supplied to the entire backlight, even to illuminate just one pixel in the display. In contrast, an OLED display does not necessarily include a backlight. Furthermore, in an OLED display, preferably, only the illuminated pixel draws power.

The power efficiency of OLED technology presents a possibility for designing nodes that provide enhanced security and functionality. Illustrative devices that may be constructed using OLED technology are disclosed in U.S. Pat. No. 9,665,818, which is hereby incorporated by reference herein in its entirety.

A node may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, being executed by a computer. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that powers one or more components of a node.

Sensors in a single architecture or other grouping may be produced by different manufacturers. Sensors may capture data in different formats. For example, sensors may use different data structures to package captured data. Sensors 103 may utilize different communication protocols to transmit captured data or communicate with other nodes. Despite such operational differences, sensors 103 may operate substantially seamlessly together. Interoperability may allow captured data to be substantially seamlessly captured and interpreted by data analysis engine 109. Based on interpreting the captured data, data analysis engine 109 may issue instructions to actuators 107.

Interoperability may be implemented across any suitable nodes of architecture 100. Interoperability may enable communication between sensors 103 and other nodes. Interoperability may enable architecture 100 to provide services and applications via actuators 107. Interoperability may allow services and content to be provided anywhere, anytime and based on input/output of different nodes.

Data gathering by one or more of sensors 103 may be controlled by one or more other nodes of architecture 100. For example, data analysis engine 109 may control a quantity of data captured by sensors 103. Alternatively, data repository 101 and/or analysis engine 109 may filter or otherwise intelligently process data captured by sensors 103.

Timing of when data is captured by sensors 103 may be controlled by any suitable node on architecture 100. For example, data may be captured in real-time or at pre-defined intervals such as once a day. Data may also be captured in response to a detected environmental status change.

Data analysis engine 109 may filter data captured by sensors 103. Data analysis engine 103 may repackage or reformat captured data. Data conversion may include transformation of low level raw data (possibly from multiple sensors or groups of sensors) into meaningful information for a target audience or for a target analysis.

For example, captured data intended for human consumption or interaction may be converted into a human understandable format. Captured data intended for machine consumption may be converted into a format readable by a particular machine or node.

Data analysis engine 109 may perform pattern recognition to identify correlations and trends in captured data. Data analysis engine 109 may also evaluate a cost of obtaining data. "Costs" may be monetary (e.g., labor costs or infrastructure costs), time-related or related to a level of intrusion needed to obtain desired data. "Costs" may be bandwidth-related.

For example, a communication link may be associated with a fixed bandwidth. The bandwidth may limit an amount of information or a rate of transmission over the communication link.

For example, a sensor may respond slowly to a request from another node if there is a large amount of informational traffic traveling on a communication link shared with other nodes. The large amount of informational traffic may not leave sufficient bandwidth for the transmitting node to timely communicate with the requesting node.

As a further example, a sensor may respond slowly if the sensor transmits a large amount of captured data. The large amount of information transmitted by the sensor, together with other informational traffic traveling on the shared communication link, may be close to, or exceed the bandwidth of the communication link. As a result, sensors may be unable to transmit captured date in a timely manner.

Data travelling within architecture 100 to/from nodes may be routed along multiple communication links until the transmitted information reaches a desired destination node (e.g., data analysis engine 109). Each communication link may service a number of connected nodes and a respective volume of informational traffic.

It may be difficult to ascertain available bandwidth on a particular communication link. It may be difficult to ascertain which communication links are being utilized to transmit information between nodes. Nodes attempting to transmit information over a communication link may not be aware of a number of connected nodes, a volume of traffic on a particular communication link or a bandwidth capacity of a communication link.

Furthermore, a communication link may be controlled by a different entity from an entity responsible for operation of a particular node. The entity responsible for operation of the node may be unable to monitor a number of nodes that share a communication link, a bandwidth capacity of a communication link or a volume of traffic transmitted on a communication link. Despite difficult to predict conditions on a communication link, it would be desirable for a node to timely respond to a request for information or timely receive desired information.

Sensors 103 may belong to, or operated by, different administrative/management domains. Sensors 103 may be operated by different domains without expressly-defined relationships among such domains. The absence of express relationships enables access to data captured by sensors 103 by one or more architectures having one or more features in common with architecture 100. Groups of sensors may include sensors from two or more administrative domains.

Data repository 101 may receive data captured by sensors 103. In some embodiments, data captured by sensors 103 may be transmitted directly to data analysis engine 109. Data stored in repository 101 may be sorted and analyzed by data analysis engine 109. Data stored in data repository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may optimize processes, reduce loss (e.g., fraud), improve customer understanding and targeting, increase automation, decrease latency in products and/or services provided by actuators 107 and identify new analytical models that may utilize data captured by sensors 103.

Architecture 100 may include one or more layers of software applications. Software applications may implement a variety of functions and provide varied services to nodes of architecture 100. Software applications running on data analysis engine 109 may submit requests to sensors 103 for retrieval of specific data to achieve a functional goal provided by actuators 107. Software applications may control data captured by sensors 103 or actions taken by actuators 107. Software applications may control a flow of information within architecture 100.

Software applications may be implemented on a node. A node may be an enterprise system or a "cloud" of computing devices. On device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as sensors (e.g., to achieve a target functionality). Middleware may be responsible for aggregating data captured by sensors 103 and passing captured data to data repository 101 and/or data analysis engine 109.

Software applications may provide security services that mitigate threats to the integrity of data captured by sensors 103 or architecture 100 generally.

Actuators 107 may respond to data transmitted or processed by other nodes such as data analysis engine 109. Actuators 107 may include devices that modify the physical state of a physical entity. Actuators 107 may include devices that modify a virtual state of information. For example, actuators 107 may move (translate, rotate, etc.) physical objects or activate/deactivate functionalities of more complex ones. An actuator may dim a light bulb, open a door, change a climate setting, authorize access to an automated-teller-machine ("ATM") and/or any other suitable functionality. Actuators 107 may verify identities, trigger electronic payments, extend credit or debit accounts.

Within an intelligent networked system such as architecture 100, sensors 103 perform the functions of input devices—they serve as, for example, "eyes," collecting information about their environment. In contrast, actuators 107 act as "hands," implementing decisions based on data captured by sensors 103. A single node may include the functions of sensors and actuators.

Actuators 107 may communicate with data analysis engine 109 and sensors 103. Actuators 107 may include an application programming interface ("API") for communicating with other nodes. Actuators 107 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision and communication processes for actuators 107.

In the absence of express relationships between sensors and the devices that access data captured by the sensors traditional approaches for managing trust, security naming, discovery, or other traditional network services may not be applicable or available.

Generally, nodes of architecture 100 may interact and cooperate using one or more interaction paradigms. Exemplary interaction paradigms include client'server and peer-to-peer interactions. Illustrative communication protocols may include HyperText Transfer Protocol ("HTTP"), Simple Object Access Protocol ("SOAP"), Representational State Transfer ("REST") Constrained Application Protocol ("CoAP") or SensorML.

As a result of the disparate nature of sensors 103, an architecture, such as architecture 100 incorporating sensors 103 may support a variety of communication protocols. Illustrative supported protocols may include IEEE 802.15.4 ("ZigBee"), IEEE 802.11, 3G and 4G and LTE. For example, ZigBee requires approximately 20 to 60 mW (for 1 mW transmission power, a range of 10 to 100 meters and a data transmission rate of 250 kbit/s).

To conserve energy, a sensor may communicate wirelessly for short periods of time. Utilizing this approach, one or more standard size single cell cylindrical dry battery batteries (e.g., AA size) may provide requisite computing power and wireless communication for many months.

Communication protocols used by nodes (e.g., sensors or actuators) may not have, or may not be capable of having, security capabilities. A security layer or buffer may be implemented by nodes that receive or rely on data captured by insecure sensors. Sensors or other nodes may be dynamically added or removed from an architecture. A security layer or buffer may be modular to scale quickly and meet growth/contraction requirements.

A physical layer may physically link nodes of architecture 100. The function of this physical layer is to provide communication pathways to carry and exchange data and network information between multiple sub-networks and nodes.

Figure 2:
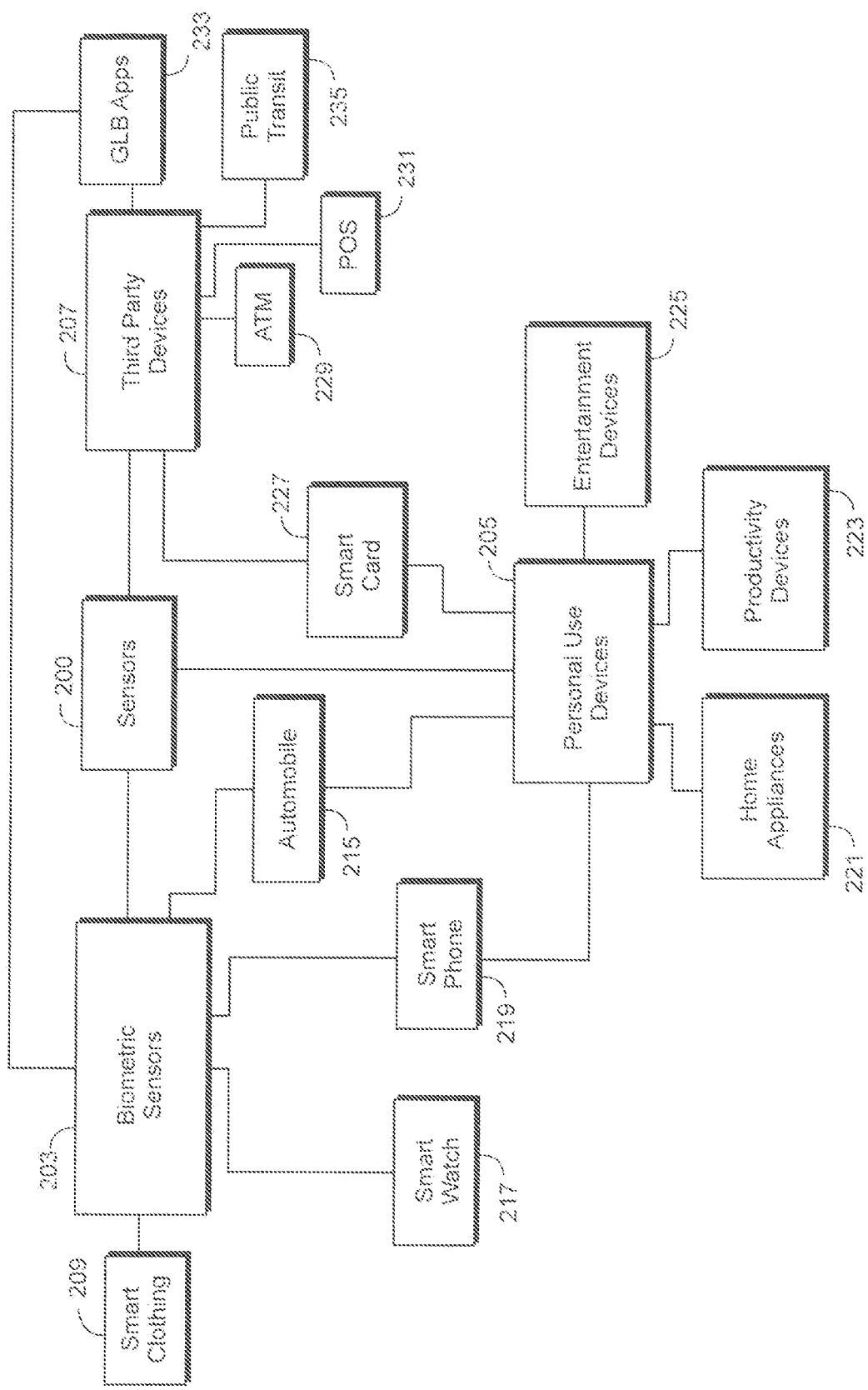
FIG. 2 shows illustrative sensors in accordance with principles of the invention.

FIG. 2 shows illustrative sensors 200. Sensors 200 may include or more features of sensors 103 (shown in FIG. 1). Sensors 200 include biometric sensors 203 that sense biometric attributes. For example, biometric sensors may be embedded in "smart" clothing 209 that monitors a wearer's physical condition. Such clothing may capture biometric data and physical movement. Smart clothing may be linked to smart phone 219 such as via a Bluetooth® communication link. Smart phone 219 may transmit data captured by smart clothing 209 to one or more other network nodes.

Biometric sensors 203 may include other illustrative sensors such as sleep monitor 213, smart watch 217, smart phone 219 and automobile 215.

Sensors 200 may include personal use devices 205. Personal use devices 205 may include sensors embedded in home appliances 221, productivity devices 223 or entertainment devices 225. Productivity devices 223 may include tablets, laptops or other personal computing devices. Entertainment devices may include gaming consoles and the like.

Sensors 200 also include third-party devices 207. Third-party devices may include devices that are not under the direct or exclusive control of a user. A user may interact with third-party devices 207 to obtain a desired service provided by the third-party.

Exemplary third party devices include smart card 227. Smart card 227 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Suitable purchasing instruments may include a credit card, debit card and electronic purchasing devices. Such purchasing instruments may sense a location or frequency of use.

Such purchasing instruments may include "EMV" chips. EMV is a technology that derives its name from the companies (Europay, MasterCard, and Visa) that helped develop the technology. When the credit card and its associated EMV chip are inserted into a specialized card reader (another sensor), the reader powers the EMV chip and the EMV chip generates a new authorization code each time the credit card is used. The EMV chip may capture transaction data such as amounts, location or identity of the chip reader.

Third-party sensors 207 may include ATMs 229, point-of-sale terminals ("POS") 231 and public transit 235. Such devices may also be actuators.

Third-party devices may also include software applications 233. Applications 233 may be used to access services, such as an online banking portal. Such applications may detect biometric features to authorize access to the online banking portal. Third-party devices may include sensors that capture data associated with power consumption (e.g., smart grids), electronic communication traffic, logistics (package movement) or any other suitable environmental condition.

FIG. 200 shows that sensors may categorically overlap. For example, an application used to access an online bank portal may capture a biometric feature (e.g., fingerprint) to authenticate a user.

Each of the sensors shown in FIG. 200 may include different and possibly incompatible hardware. For example, sensors may each have different operating systems (or none at all), processor types and memory. Sensors 200 may be inexpensive, single-function devices with rudimentary network connectivity. Sensors 200 may be positioned in remote and/or inaccessible locations where human intervention or configuration is difficult.

To conserve power, sensors 200 may utilize 16-bit microcontrollers. Such microcontrollers may use less than 400 µW per MIPS ("million instructions per second") and may be capable of operating TCP/IPv6 stacks with 4 kB RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication standards.

Furthermore, because of potentially disparate features and characteristics of sensors 200, security solutions disclosed herein may be used to verify an authenticity of data transmitted by sensors having disparate hardware and software capabilities.

Figure 3:
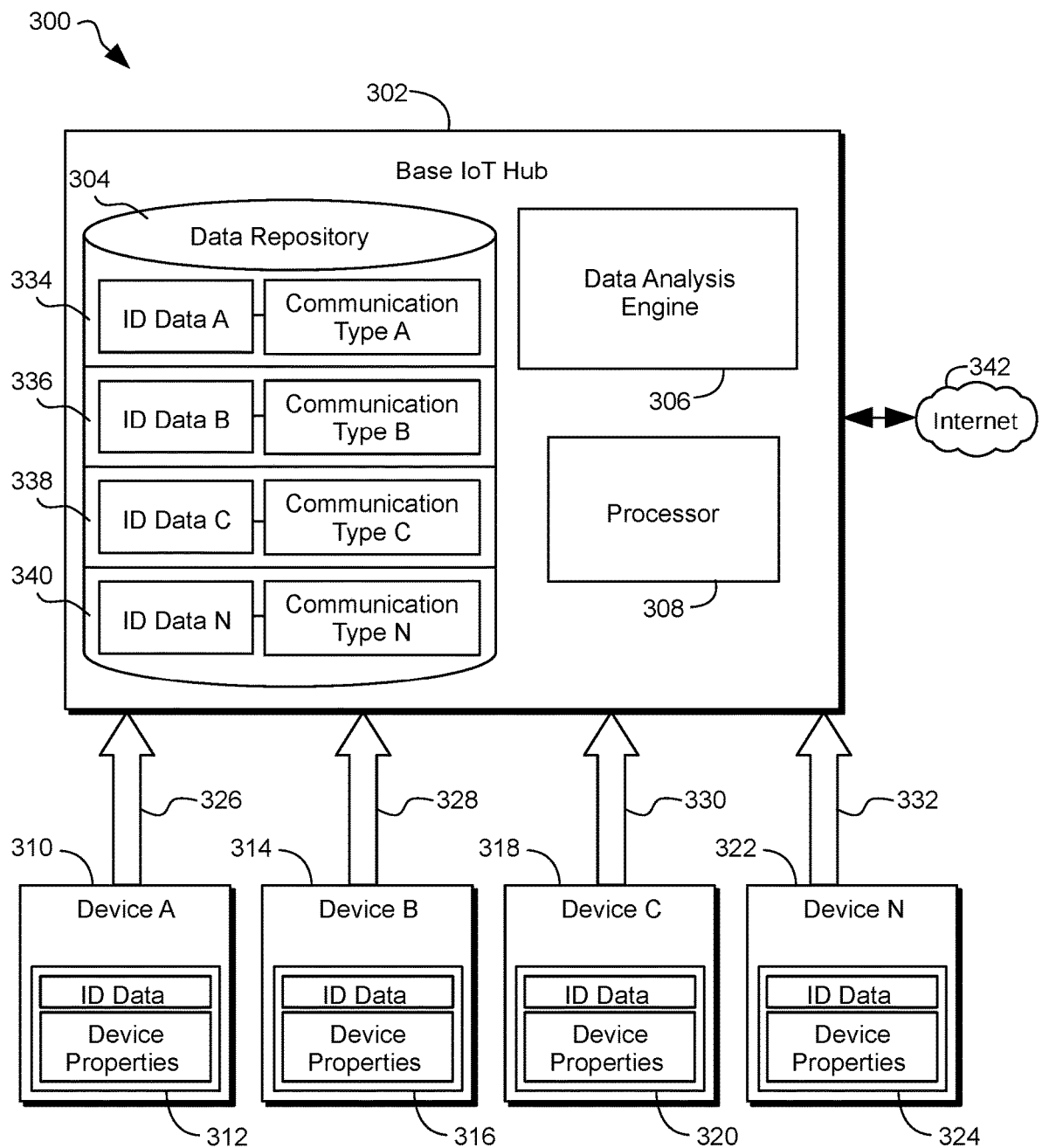
FIG. 3 shows another illustrative system in accordance with principles of the invention.

FIG. 3 shows illustrative system 300. System 300 may represent a network system formed from a plurality of IoT devices. Base IoT hub 302 may be the base hub to which a plurality of IoT devices may link. The base hub 302 may be the intermediary layer for a communication to pass through prior to execution. Base IoT hub 302 may serve as an authentication layer for device A at 310, device B at 314, device C at 318 and device N at 322 included in the system. Base IoT hub 302 may operate as a proxy hub. Base IoT hub 302 may represent all IoT devices that may be linked to the hub. The devices may be simultaneously linked to the base IoT hub 302.

The IoT devices may be in electronic communication with the internet, solely via base IoT hub 302 at 342. Each of the IoT devices may be disconnected from the internet from within the device itself. When a communication is authenticated at base IoT hub 302, base IoT hub 302 may execute and directly transmit the communication to internet 342. In an alternative embodiment, base IoT hub 302 may prevent any individual device that may be within a pre-determined proximity from connecting to the internet.

Base IoT hub 302 may include within the hub, a data repository 304, a data analysis engine 306 and a processor 308. Base IoT hub may include additional components not shown in FIG. 3. Data repository 304 may be used for storing data associated with each of the IoT devices. Data analysis engine 306 may analyze communications received from the IoT devices and authorize the communications based on the data stored in the data repository 304. Processor 308 may be configured to execute a communication or to terminate a communication based on the analysis.

Devices A, B, C and N as shown at 310, 314, 318 and 322 may be standalone devices and may not be associated with each other. The devices may then be linked as a network. Base IoT hub 302 may be selected as the base hub to which each of the IoT devices connect. Device A at 310 may be linked to base IoT hub 302 at communication link 326. Device A may include device properties and identification data 312 associated with the device itself. When device A 310 is linked to base IoT hub 302, identification data 312 may be transmitted to the hub via communications link 326 and may be stored in data repository 304 at 334. Device B at 314 may be another device in the network and may be linked via communications link 328 to the base IoT hub 302. Device B at 314 may include device properties and identification data 316 associated with the device. When device B at 314 is linked to base IoT hub 302, identification data 316 may be transmitted to the hub via communication link 328 and may be stored in data repository 304 at 336.

Device C at 318 may be another device in the network and may be linked via communications link 330 to the base IoT hub 302. Device C at 318 may include device properties and identification data 320 associated with the device. When device C at 318 is linked to base IoT hub 302, identification data 320 may be transmitted to the hub via communications link 330 and may be stored in data repository 304 at 338. Device N at 322 may be an additional device in the network and may be linked via communications link 332 to the base IoT hub 302. Device N at 322 may include device properties and identification data 324 associated with the device. When device N at 322 is linked to base IoT hub 302, identification data 324 may be transmitted to the hub via communications link 332 and may be stored in data repository 304 at 340.

Data analysis engine 306 may be enabled to determine the communication-types typically associated with each of the IoT devices linked to the hub 302, based on the device's properties and identification data of the device. The communication-types for each device may then also be stored on the same row in the data repository as the identification data of the device.

A device may be triggered to transmit data. The trigger may come from data captured by a sensor embedded in the device. The trigger may come from data captured by a sensor in another device in the system. One or more devices in the system may then send out a communication. The communication may be a request for data from the internet. The request may be a request from a server in the cloud. The communication may be transmitted, via the communication link of the device, to the base IoT hub for authorization. Data analysis engine 306 may perform an analysis based on stored data in data repository 304 to authorize the communication.

Figure 4:
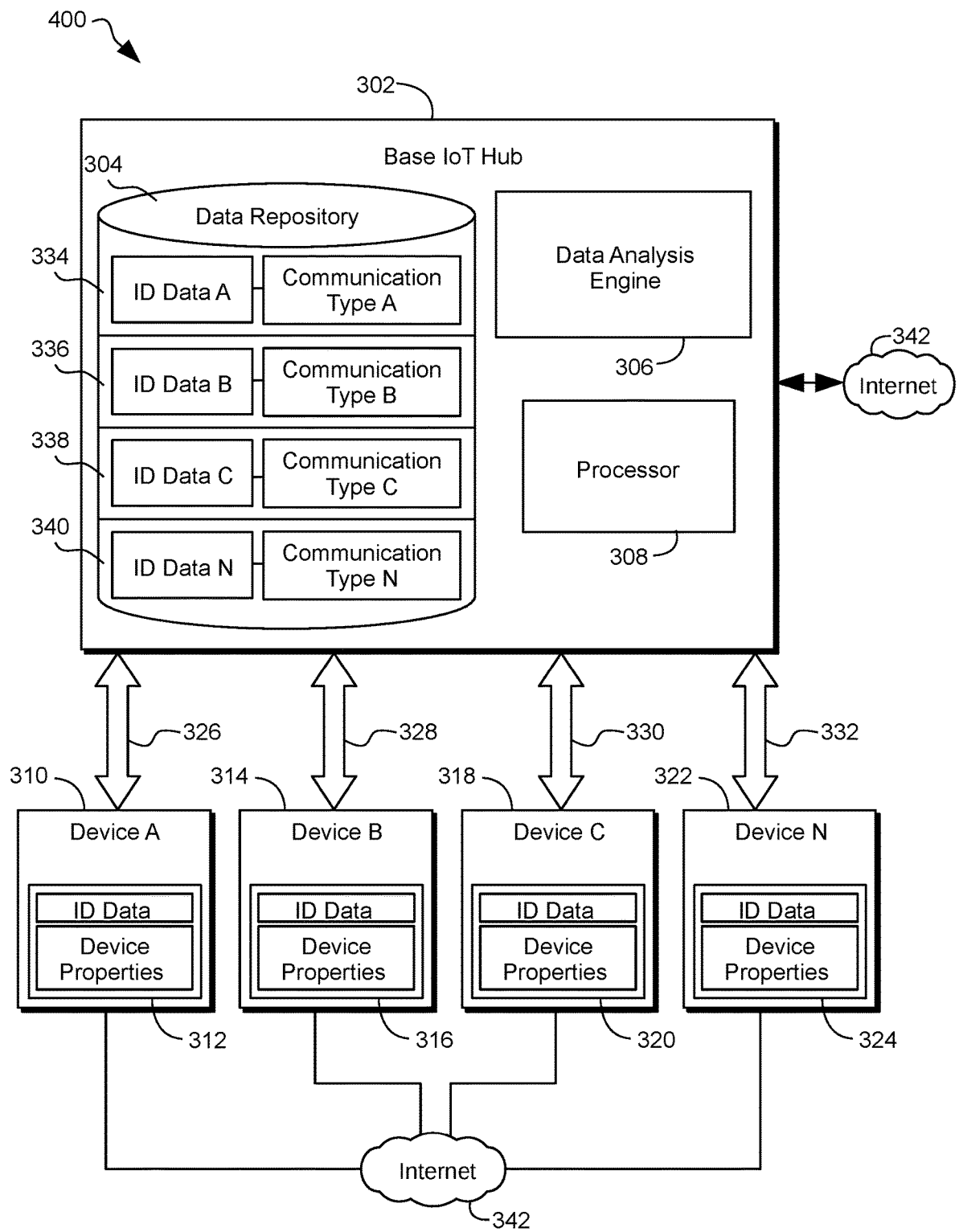
FIG. 4 shows another illustrative system in accordance with principles of the invention.

FIG. 4 shows illustrative system 400. System 400 includes elements of system 300, shown in FIG. 3. In system 400, devices A, B, C and N are in direct electronic communication with internet 342. System 400 may include communication with internet 342 via base IoT hub 302.

Figure 5:
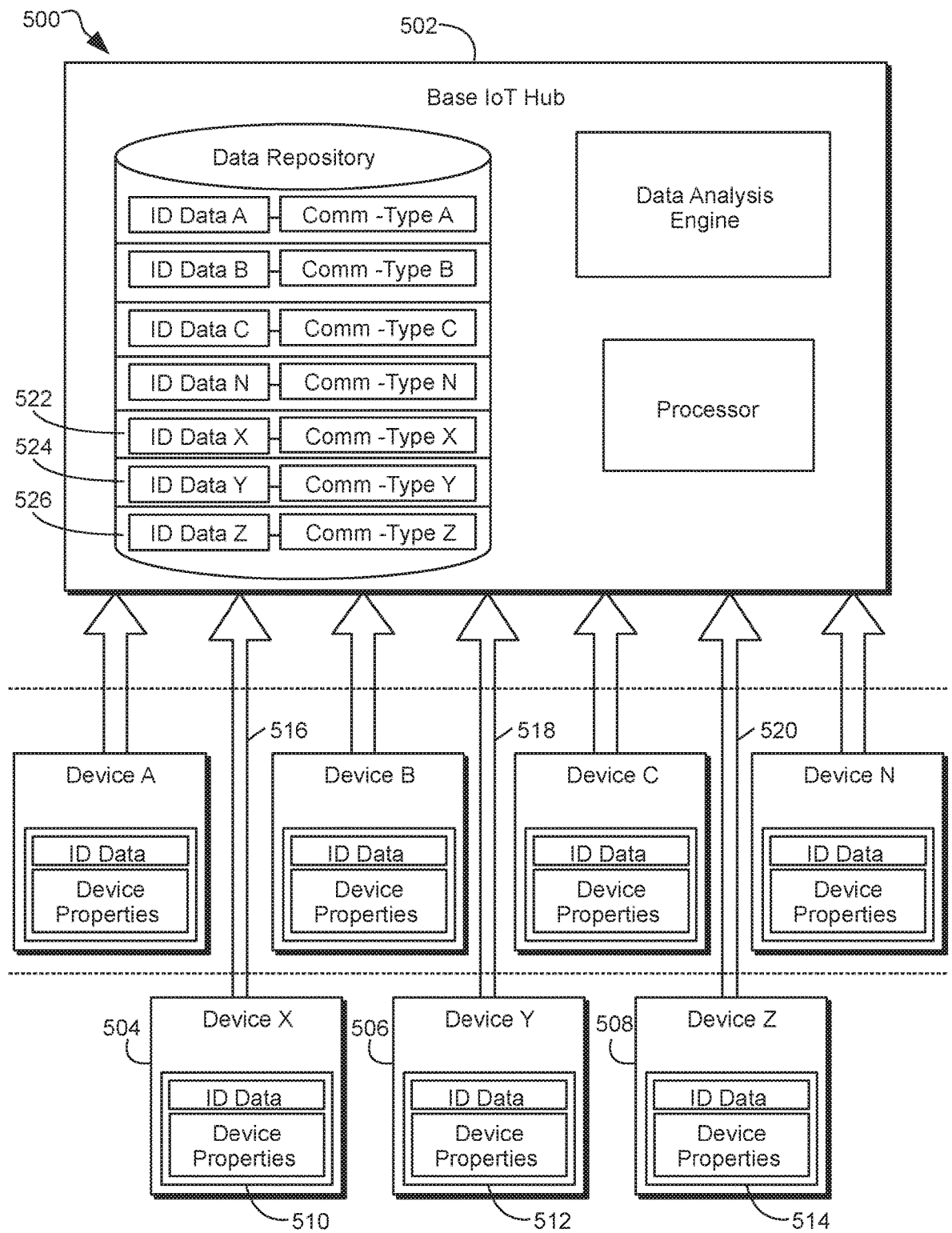
FIG. 5 shows an illustrative system in accordance with principles of the invention.

FIG. 5 shows illustrative system 500. System 500 may represent the system as shown at FIG. 3 with additional embodiments. IoT devices A, B, C and N may be linked simultaneously to the base IoT hub 502. The system is configured to link, at a later time, additional IoT devices to the system.

Device X at 504 may be a device being linked to the system after the initial linking. Device X may include identification data and device properties 510. Device X may link to base IoT hub 502 via communication link 516. The identification data of device X at 510 may be transmitted to the hub via communications link 516 and may be stored in the data repository at 522. Device Y at 506 may be another device now being linked to the system. Device Y at 506 may include identification data and device properties 512. Device Y may link to base IoT hub 502 via communication link 518. The identification data of device Y may be transmitted to the hub via communications link 518 and may be stored in the data repository at 524. Device Z at 508 may be an additional device now being linked to the system. Device Z at 508 may include identification data and device properties 514. The identification data of device Z may be transmitted to the hub via communication link 520 and may be stored in the data repository at 526.

IoT devices A, B, C and N may be linked together at the same time. System 500 may enable IoT devices to join the network at a later time. The additional IoT devices may be enabled to retroactively link to the base IoT hub—i.e., linked as a device which is valid for communications that originated prior to the linking.

Figure 6:
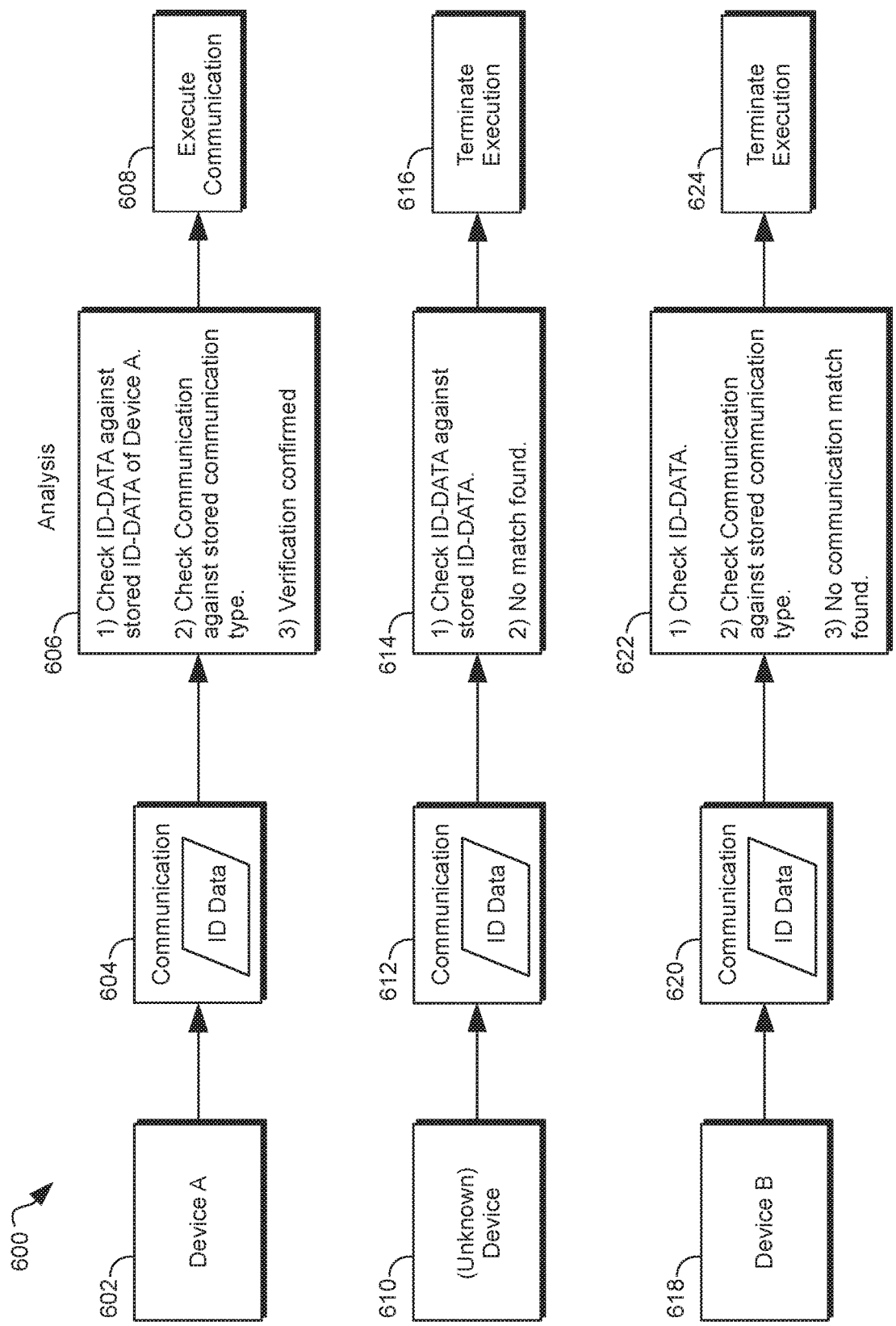
FIG. 6 shows an illustrative flow diagram in accordance with principles of the invention.

FIG. 6 shows illustrative flow diagram 600 of a network of IoT devices in communication with the base IoT hub. In a first example, device A at 602 is sending out a communication 604. The communication 604 is being transmitted along with identification data associated with the device 602. Data analysis engine may perform an analysis at 606 of the communication 604 for authorizing transmittal. The analysis may encompass comparing the identification data of the device 602 to the identification data of device A stored in the data repository. The analysis may further encompass comparing the communication 604 to the communication-types associated with device A stored in the data repository. Since device A is linked to the base IoT hub, both the identification data and the communication correspond and the communication is executed by processor 608 of the base IoT hub.

In another example, unknown device 610 is sending out a communication 612. Device 610 is an unauthorized device not linked to the network of IoT devices in the system. The device may be attempting to hack the network. The system may be enabled to cut off the communication based on an analysis. The communication 612 may be transmitted along with identification data associated with unknown device 610. The data analysis engine may perform an analysis at 614 and determine that the identification data of the device 610 does not match any one of the IoT devices identification data stored in the data repository. The processor 608 may then be configured to terminate the execution of the communication as shown at 616.

Device B at 618 may be an example of an unauthorized attacker attempting to access a device that is linked to the network and attempting to send out a communication that is not secure. Device B at 618 may send out communication 620. The communication may include identification data associated with device B. The data analysis engine may perform an analysis at 622. The identification data included in the communication may match the identification data of device b stored in data repository 304. The data analysis engine may determine however, that communication 620 does not match the communication-types stored for device B at 334 in the data repository. The processor may then be configured to terminate the execution as shown at 624.

Thus, methods and apparatus for securing communication in a network formed from a plurality of IoT devices have been provided. Persons skilled in the art will appreciate that the present invention can be practiced by other than the described embodiments, which are presented for purposes of illustration rather than of limitation. The present invention is limited only by the claims that follow.

What is claimed is:
1. A system for securing communication on an Internet of Things ("IoT") network, the system comprising:
    a plurality of IoT devices, each IoT device including electronics, software, and sensors, each IoT device configured to send and receive electronic communications, each IoT device having an IP address, each IoT device being included in the IoT network;
    a base IoT hub linked to each IoT device, the base IoT hub comprising:
        a data repository configured to store identification data for each linked-IoT device and a communication type associated with each linked IoT device;
        a data analysis engine configured to authenticate communications transmitted from each IoT device to via the base IoT hub prior to executing the communications; and
        a processor configured to process and execute the communications;
    the base IoT hub being segmented into a plurality of channels, each channel operating as an individual base IoT hub, each individual base IoT hub comprising an IP address different from an IP address of the base IoT hub and different from the IP address of an active IoT device;
    wherein, when an IoT device, from the plurality of IoT devices, is activated in response to a sensor being triggered in the IoT device, wherein the IoT device, when activated, is the active IoT device:
        the active IoT device is configured to transmit a communication via to the IoT base IoT hub;
        in response to receiving the communication from the active IoT device, the data analysis engine is configured to:
            compare the communication from the active IoT device to the communication type stored in the data repository and associated with the active IoT device; and
            compare the identification data for the active IoT device to the identification data associated with the active IoT device in the data repository;
        when the communication from the active IoT device corresponds to a communication type stored in the data repository and the identification data for the active IoT device corresponds to identification data stored in the data repository, the processor is configured to execute the communication via one of the individual base IoT hubs, the one individual base IoT hub acting as an originator of the communication; and
        when the communication from the active IoT device does not correspond to a communication type stored in the data repository or the identification data for the active IoT device does not correspond to identification data stored in the data repository, the processor is configured to:
            terminate the communication from the active IoT device prior to execution; and
            assign a new IP address to the active IoT device.
2. The system of claim 1, wherein the base hub is further configured to retroactively link 10 an unlinked active IoT device, wherein the active IoT device has generated a communication and the link is retroactively timed to a time prior to generation of the communication.

3. The system of claim 1, wherein the communication from the active IoT device is generated in response to trigger data received by a sensor embedded in the active IoT device.

4. The system of claim 1, wherein communications on the IoT network via the IoT base hub comprise one of:
communication between a first IoT device and a second IoT device;
communication between an application running in the cloud and an IoT device; and
communication between a service in the cloud and an IoT device.

5. The system of claim 1, wherein the identification data for each linked IoT device comprises a user-set configuration.

6. The system of claim 1, wherein, when the communication from the active IoT device is transmitted within a range of 0 to 100 meters, communication protocols are selected from one or more of Wi-Fi, Bluetooth, ZigBee, Z-wave, and 4G LTE.

7. The system of claim 1, wherein, when the communication from the active IoT device is transmitted within a range of 0 to 100 kilometers, communication protocols are selected from one or more of Wi-Fi, 4G LTE, Sigfox, and OnRamp.

8. The system of claim 1, wherein each linked IoT device comprises a direct connection to the internet.

9. The system of claim 1, wherein each linked IoT device is configured to connect to the internet exclusively via the base IoT hub.

10. The system of claim 1, wherein the base IoT hub is further configured to:
serve as a proxy for each linked IoT device; and
execute all communication for each linked IoT device via the base IoT hub.

11. The system of claim 10, wherein the executing the communication from the active IoT device via the base IoT hub further comprises, masking the IP address of the active IoT device.

12. The system of claim 1, wherein when the communication from the active IoT device does not correspond to a communication type stored in the data repository or the identification data for the active IoT device does not correspond to identification data stored in the data repository, the base hub is further configured to mask identification of the base IoT hub and display the linked IoT device as an individual entity.

13. A method for securing communication in a network of Internet of Things ("IoT") devices, the method comprising:
selecting a base IoT hub for operating as an intermediary layer for IoT devices, the base IoT hub comprising a data repository, a data analysis engine, and a processor;
linking each of a plurality of IoT devices within the network of IoT devices to the base IoT hub, each IoT device including electronics, software, and sensors, and configured to send and receive electronic communications, each of the IoT devices having an IP address;
storing in the data repository within the base IoT hub:
identification data for each IoT device; and
a communication type associated with each IoT device;
segmenting the base IoT hub into a plurality of channels, each channel operating as an individual base IoT hub, each individual base IoT hub comprising an IP address different from an IP address of the base IoT hub and different from the IP address of an active IoT device;
receiving a communication at the base IoT hub from an IoT device, the communication transmitted in response to a sensor triggered within the IoT device, wherein the IoT device triggered by the sensor is the active IoT device;
authenticating the active IoT device via the data analysis engine within the base IoT hub, the authentication comprising:
comparing the communication received from the active IoT device to the communication type stored in the data repository and associated with the active IoT device; and
comparing identification data for the active IoT device to the identification data stored in the data repository and associated with the active IoT device;
when the communication from the active IoT device corresponds to a communication type stored in the data repository and the identification data for the active IoT device corresponds to the identification data stored in the data repository:
masking, in the communication, the identification data of the active IoT device;
displaying, in the communication, identification data of one of the individual base IoT hubs; and
executing the communication via the one individual base IoT hub, the one individual base IoT hub acting as an originator of the communication; and
when the communication from the active IoT device does not correspond to a communication type stored in the data repository or the identification data for the active IoT device does not correspond to identification data stored in the date repository:
terminating the communication prior to executing the communication; and
assigning a new IP address to the active IoT device.

14. The method of claim 13, wherein, when the communication from the active IoT device is transmitted within a range of 0 to 100 meters, the method further comprises selecting a communication protocols from one or more of Wi-Fi, Bluetooth, ZigBee, Z-wave, and 4G LTE.

15. The method of claim 13, wherein, when the communication from the active IoT device is transmitted within a range of 0 to 100 kilometers, the method further comprises selecting a communication protocol from one or more of Wi-Fi, 4G LTE, Sigfox, and OnRamp.

16. The method of claim 13, wherein each of the IoT devices comprises a direct connection to the internet.

17. The method of claim 13, wherein each of the IoT devices is configured to connect to the internet exclusively via the base IoT hub.

18. A method for securing communication in a network of Internet of Things ("IoT") devices, the method comprising:
selecting a base IoT hub for operating as an intermediary layer for IoT devices, the base IoT hub comprising a data repository, a data analysis engine, and a processor;
linking each of a plurality of IoT devices to the base IoT hub, the plurality of IoT devices included in the network of IoT devices, each of the plurality of IoT devices including electronics, software and sensors, and configured to send and receive electronic communications, each IoT device having an IP address;
storing in the data repository within the base IoT hub:
identification data for each IoT device; and
a communication type associated with each IoT device;
segmenting the base IoT hub into a plurality of channels, each channel operating as an individual base IoT, each individual base IoT hub comprising an IP address different from an IP address of the base IoT hub and different from the IP address of an active IoT device;

receiving a communication at the base IoT hub from an IoT device, the communication transmitted in response to a sensor triggered within the IoT device, wherein an IoT device triggered by the sensor is the active IoT device;

comparing, at the data analysis engine within the base IoT hub, identification data of the active IoT device to the identification data associated with the active IoT device stored in the data repository;

when the identification data for the active IoT device does not correspond to the identification data associated with the active IoT device in the data repository, terminating the communication, via the processor, prior to executing the communication;

when the identification data for the active IoT device corresponds to the identification data associated with the active IoT device stored in the data repository:

comparing the communication from the active IoT device to the communication type associated with the active IoT device and stored in the data repository;

when the communication from the active IoT device corresponds to the communication type associated with the active IoT device stored in the data repository:

masking, in the communication, the identification data of the active device;

displaying, in the communication, identification data of one of the individual base IoT hubs; and executing the communication via the one individual base IoT hub, the one individual base IoT hub acting as an originator of the communication; and when the communication type from the active IoT device does not correspond to the communication type associated with the active IoT device stored in the data repository, terminating the communication prior to executing the communication and assigning a new IP address to the active IoT device.

* * * * *